(12) United States Patent
Barker

(10) Patent No.: US 7,944,469 B2
(45) Date of Patent: May 17, 2011

(54) SYSTEM AND METHOD FOR USING SELF-LEARNING RULES TO ENABLE ADAPTIVE SECURITY MONITORING

(75) Inventor: Geoffrey T. Barker, Bainbridge, WA (US)

(73) Assignee: Vigilos, LLC, Tyler, TX (US)

( * ) Notice: Subject to any disclaimer, the term of this patent is extended or adjusted under 35 U.S.C. 154(b) by 1407 days.

(21) Appl. No.: 11/353,879

(22) Filed: Feb. 14, 2006

(65) Prior Publication Data

US 2006/0195569 A1 Aug. 31, 2006

Related U.S. Application Data

(60) Provisional application No. 60/653,042, filed on Feb. 14, 2005.

(51) Int. Cl.
*H04N 7/18* (2006.01)
*H04N 5/225* (2006.01)
*H04N 5/232* (2006.01)

(52) U.S. Cl. ..... 348/143; 348/153; 348/159; 348/207.1; 348/211.3

(58) Field of Classification Search .......... None
See application file for complete search history.

(56) References Cited

U.S. PATENT DOCUMENTS

| | | | |
|---|---|---|---|
| 4,216,375 A | 8/1980 | Ulch et al. | |
| 4,218,690 A | 8/1980 | Ulch et al. | |
| 4,581,634 A | 4/1986 | Williams | |
| 4,714,995 A | 12/1987 | Materna et al. | |
| 4,721,954 A | 1/1988 | Mauch | |
| 4,816,658 A | 3/1989 | Khandwala et al. | |
| 4,837,568 A | 6/1989 | Snaper | |
| 4,839,640 A | 6/1989 | Ozer et al. | |
| 4,962,473 A | 10/1990 | Crain | |
| 4,998,279 A | 3/1991 | Weiss | |
| 5,097,505 A | 3/1992 | Weiss | |
| 5,204,670 A | 4/1993 | Stinton | |
| 5,210,873 A | 5/1993 | Gay et al. | |
| 5,367,624 A | 11/1994 | Cooper | |
| 5,475,375 A | 12/1995 | Barrett et al. | |
| 5,475,378 A | 12/1995 | Kaarsoo et al. | |
| 5,491,511 A | 2/1996 | Odle | |
| 5,506,986 A | 4/1996 | Healy | |
| 5,541,911 A | 7/1996 | Nilakantan et al. | |

(Continued)

FOREIGN PATENT DOCUMENTS

EP 0 804 031 A2 10/1997

(Continued)

OTHER PUBLICATIONS

"AXIS 200+ Web Camera," Axis Communications brochure NE001/US/R2: 15924, 1998.

(Continued)

*Primary Examiner* — John M Villecco
(74) *Attorney, Agent, or Firm* — Andrews Kurth LLP

(57) ABSTRACT

Rules "learn" what is typical or expected for a certain attribute of device data for a given location, premises, time period, etc. Using a rule for a standard deviation the variance between newly collected data and the data stored in a fact table is either ignored or an alert (or some action) is generated. Data in the fact table is sampled for a specific time, or time period. Newly collected data may be used to update the fact table or discarded.

20 Claims, 8 Drawing Sheets

U.S. PATENT DOCUMENTS

| | | | |
|---|---|---|---|
| 5,544,062 A | | 8/1996 | Johnston, Jr. |
| RE35,336 E | | 9/1996 | Ulch et al. |
| 5,600,368 A | | 2/1997 | Matthews, III |
| 5,614,890 A | | 3/1997 | Fox |
| 5,619,183 A | | 4/1997 | Ziegra et al. |
| 5,629,981 A | | 5/1997 | Nerlikar |
| 5,664,186 A | | 9/1997 | Bennett et al. |
| 5,675,738 A | | 10/1997 | Suzuki et al. |
| 5,678,039 A | | 10/1997 | Hinks et al. |
| 5,680,328 A | | 10/1997 | Skorupski et al. |
| 5,682,142 A | | 10/1997 | Loosmore et al. |
| 5,717,379 A | | 2/1998 | Peters |
| 5,729,471 A | | 3/1998 | Jain et al. |
| 5,742,286 A | | 4/1998 | Kung et al. |
| 5,768,119 A | | 6/1998 | Havekost et al. |
| 5,771,354 A | | 6/1998 | Crawford |
| 5,813,009 A | | 9/1998 | Johnson et al. |
| 5,821,855 A | | 10/1998 | Lewis |
| 5,831,669 A | * | 11/1998 | Adrain ................. 348/143 |
| 5,838,368 A | | 11/1998 | Masunaga et al. |
| 5,838,682 A | | 11/1998 | Dekelbaum et al. |
| 5,848,143 A | | 12/1998 | Andrews et al. |
| 5,870,733 A | | 2/1999 | Bass et al. |
| 5,879,163 A | | 3/1999 | Brown et al. |
| 5,903,455 A | | 5/1999 | Sharpe, Jr. et al. |
| 5,903,730 A | | 5/1999 | Asai et al. |
| 5,917,405 A | | 6/1999 | Joao |
| 5,923,264 A | | 7/1999 | Lavelle et al. |
| 5,937,415 A | | 8/1999 | Sheffield et al. |
| 5,943,673 A | | 8/1999 | Felouzis et al. |
| 5,960,174 A | | 9/1999 | Dew |
| 5,987,519 A | | 11/1999 | Peifer et al. |
| 6,011,547 A | | 1/2000 | Shiota et al. |
| 6,012,100 A | | 1/2000 | Frailong et al. |
| 6,023,223 A | | 2/2000 | Baxter, Jr. |
| 6,031,455 A | | 2/2000 | Grube et al. |
| 6,064,723 A | | 5/2000 | Cohn et al. |
| 6,075,553 A | | 6/2000 | Freeman et al. |
| 6,076,111 A | | 6/2000 | Chiu et al. |
| 6,085,227 A | | 7/2000 | Edlund et al. |
| 6,091,771 A | | 7/2000 | Seeley et al. |
| 6,115,040 A | | 9/2000 | Bladow et al. |
| 6,133,941 A | | 10/2000 | Ono |
| 6,157,956 A | | 12/2000 | Jensen et al. |
| 6,166,729 A | | 12/2000 | Acosta et al. |
| 6,185,316 B1 | | 2/2001 | Buffam |
| 6,226,031 B1 | | 5/2001 | Barraclough et al. |
| 6,233,588 B1 | | 5/2001 | Marchoili et al. |
| 6,239,833 B1 | | 5/2001 | Ozaki et al. |
| 6,243,129 B1 | | 6/2001 | Deierling |
| 6,271,752 B1 | | 8/2001 | Vaios |
| 6,271,805 B1 | | 8/2001 | Yonezawa |
| 6,298,474 B1 | | 10/2001 | Blowers et al. |
| 6,304,857 B1 | | 10/2001 | Heindel et al. |
| 6,311,210 B1 | | 10/2001 | Foladare et al. |
| 6,324,647 B1 | | 11/2001 | Bowman-Amuah |
| 6,356,949 B1 | | 3/2002 | Katsandres et al. |
| 6,362,836 B1 | | 3/2002 | Shaw et al. |
| 6,369,695 B1 | | 4/2002 | Horon |
| 6,430,740 B1 | | 8/2002 | Hart et al. |
| 6,529,936 B1 | | 3/2003 | Mayo et al. |
| 6,542,075 B2 | | 4/2003 | Barker et al. |
| 6,564,380 B1 | | 5/2003 | Murphy |
| 6,570,610 B1 | * | 5/2003 | Kipust ................. 348/156 |
| 6,686,838 B1 | | 2/2004 | Rezvani et al. |
| 6,697,103 B1 | | 2/2004 | Fernandez et al. |
| 6,698,021 B1 | | 2/2004 | Amini et al. |
| 6,714,977 B1 | | 3/2004 | Fowler et al. |
| 6,721,391 B2 | | 4/2004 | McClelland et al. |
| 6,741,171 B2 | | 5/2004 | Palka et al. |
| 6,985,172 B1 | * | 1/2006 | Rigney et al. ................. 348/149 |
| 7,003,670 B2 | | 2/2006 | Heaven et al. |
| 7,013,334 B2 | | 3/2006 | Toyoshima et al. |
| 7,136,507 B2 | * | 11/2006 | Han et al. ................. 382/103 |
| 7,369,680 B2 | * | 5/2008 | Trajkovic et al. ............. 382/103 |
| 7,646,401 B2 | * | 1/2010 | Lipton et al. ................. 348/143 |
| 2002/0019945 A1 | | 2/2002 | Houston et al. |
| 2002/0031230 A1 | | 3/2002 | Sweet et al. |
| 2005/0002561 A1 | * | 1/2005 | Monachino et al. .......... 382/159 |
| 2005/0146605 A1 | * | 7/2005 | Lipton et al. ................. 348/143 |
| 2005/0225637 A1 | * | 10/2005 | Eghbalian ................. 348/155 |

FOREIGN PATENT DOCUMENTS

| | | |
|---|---|---|
| WO | WO 97/07486 A1 | 2/1997 |
| WO | WO 01/28251 A1 | 4/2001 |

OTHER PUBLICATIONS

"AXIS 240 Camera Server," Axis Communications brochure NE002/ US/R1: 15925, 1998.

"EyeCast Announces EyeCapture Services," Press Release, Jul. 8, 1998, Sterling, Virginia, <www.eyecast.com/news/releases/070898. asp> [retrieved Sep. 27, 1999].

"EyeCast.com Adds 360-Degree Continuous Pan Rotation Cameras to It's [sic] EyeView Service," Press Release, Mar. 15, 1999, Sterling, Virginia, <www.eyecast.com/news/releases/031599.asp> [retrieved Sep. 21, 1999].

"EyeCast.com Announces EyeView Control," Press Release, Oct. 12, 1998, Sterling, Virginia, <www.eyecast.com/news/releases/101298. asp> [retrieved Sep. 24, 1999].

"Eyecast.com, Inc.: Providing Live Interactive Video for Surveillance & Monitoring Over the Internet," slide presentation, as early as Dec. 26, 2001.

"EyeCast.com Introduces SchoolCast Services for School Safety Officials and Law Enforcement Agencies," Press Release, Apr. 28, 1999, Sterling, Virginia, <www.eyecast.com/news/releases/090798. asp> [retrieved May 18, 2000].

"EyeCast Secures Deals: Security Companies to Use Firm's Off-Site Video Surveillance Technology," *Washington Business Journal*, Aug. 13-19, 1999, Tech Section, p. 16, <www.eyecast.com/news/washbiz. asp> [retrieved Sep. 21, 1999].

"Network Camera Servers: Features and Benefits," Axis.com, Apr. 17, 1998, <www.axis.se/products/camera_servers/cam_fb.html> [retrieved Sep. 28, 1999].

"Network Camera Servers: AXIS 240 Camera Server," Axis.com, Sep. 23, 1999, <www.axis.se/products/cam_240/> [retrieved Sep. 28, 1999].

"Take a Step Into the Future/Digital Security System," www. RemoteCams.com, <www.remotecams.com/DISSpage1a.htm; /DISSpage2a.htm; /DISSconfiguration.htm; /DISSsystem.htm> [retrieved Sep. 17, 1999].

"White Papers: Network Cameras Applications and Solutions," Axis. com, Apr. 17, 1998, <www.axis.se/products/camera_servers/cam_ app_sol.htm> [retrieved Sep. 28, 1999].

* cited by examiner

SYSTEM AND METHOD FOR USING SELF-LEARNING RULES TO ENABLE ADAPTIVE SECURITY MONITORING

CROSS-REFERENCE TO RELATED APPLICATION

This application claims the benefit of U.S. Provisional Application No. 60/653,042, entitled SYSTEM AND METHOD FOR USING SELF-LEARNING RULES TO ENABLE ADAPTIVE SECURITY MONITORING, and filed on Feb. 14, 2005. U.S. Provisional Application No. 60/653,042 is incorporated by reference herein.

FIELD OF THE INVENTION

The present invention relates generally to a security monitoring network and, in particular, to a system and method for using self-learning rules to enable adaptive security monitoring.

BACKGROUND

Generally described, electronic security monitoring networks utilize programmatic rules to identify and trigger reactions to event conditions. For example, a monitoring system might be configured to activate video recording or to sound an audible alarm when a motion sensor has detected movement within a monitored premises. However, conventional systems lack the ability to "learn" from the data that is collected to enable adaptive response. For example, perhaps a certain amount of movement within a given premises is "normal" or expected for a certain time of day and instead of triggering a motion sensor alarm, it would be preferable to ignore or tolerate that motion. It would clearly be advantageous for a monitoring system to react to only movement that differs from the norm. Thus, there is a need for a monitoring system that can use self-learning rules to provide adaptive security monitoring.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A system and method for using self-learning rules to provide adaptive security monitoring are provided. A premises server is in communication with a variety of information sources that produce monitoring data for a premises. The information sources include subsidiary device servers, a variety of individual monitoring devices, as well as other network systems that produce data to be processed. Data may be collected and evaluated by the premises server or forwarded to a central server for evaluation.

Device data is sampled periodically and organized into fact tables maintained by a database in communication with the server that evaluates monitoring data. Fact tables organize device data into dimensions, or categories of information. Rules are applied to device data which include comparing collected device data to previously collected device data within a fact table and evaluating whether the variance between the two is within a range of tolerance, or a standard deviation.

In an actual embodiment of the present invention attributes of device data are sampled periodically to establish norms for a specific device, location, time of day, time period, etc. Alternatively, data may be continuously sampled and trends and norms continuously updated.

A rules-based monitoring system is used to test collected device data against a norm or trend for that device data type (or by location or premises). The rule will include which attributes of the device data are of interest. The rule also includes a tolerance for measuring variance between norm and newly collected data. Results outside the tolerance range trigger actions, alerts, notifications, or other devices may be activated. Tolerance range may be affected by threat level. For example, if the government adjusted an alert level, say from "green" to "yellow" the tolerance range might be narrowed in response. Rules may be used to evaluate multiple attributes. Certain attributes may be weighted to have a higher importance than other attributes.

In one embodiment, the speed of the vehicle is measured as it approaches. Most vehicles are moving 10 miles per hour by the time they are within 50 feet of the checkpoint. If the vehicle is moving at a speed higher than that, or if acceleration is detected (indicating that the driver of the vehicle might attempt to crash through a gate), a barrier is deployed.

In another embodiment, a subway system uses video cameras to monitor passenger entry and exit areas. Video based motion detection identifies movement through a field of view. Average flow through a monitored area is tracked for specified time periods. A surge in flow or a cessation of flow are indicative of possible security events.

Video analytics systems may be incorporated as a device. Video analytics software programs employ algorithms to detect and classify objects in a field of view. Rules could be applied to specific objects detected by such software. Use cases: If more than 10 people are visible in a field of view, an alert is triggered. Or, if more than 10 boxes are visible within a field of view containing only 1 individual, an alert is triggered. Or if a detected object remains in a field of view too long (as if left baggage) an alert is triggered.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
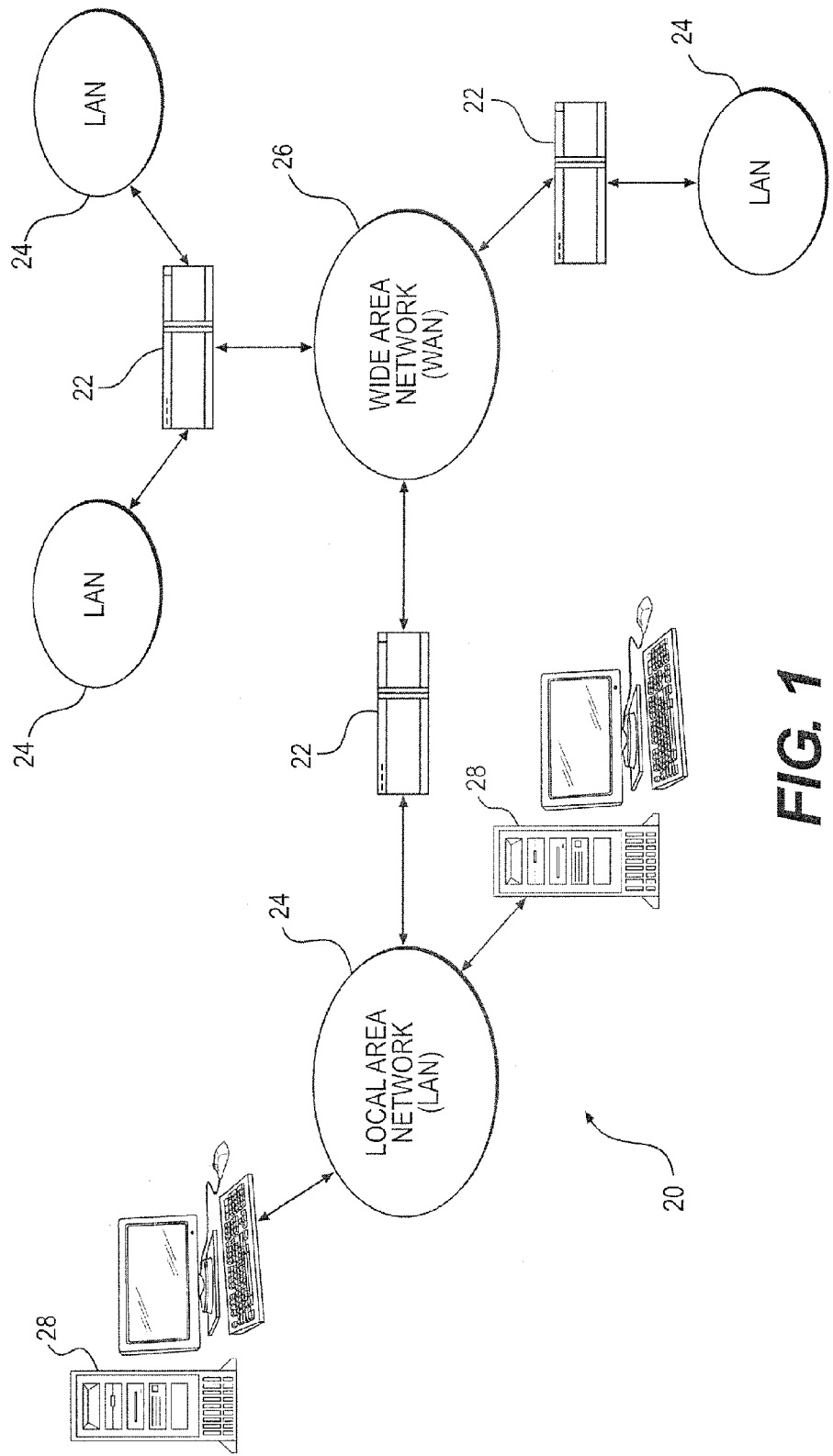
FIG. 1 is a block diagram of an Internet environment.

As described above, aspects of the present invention are embodied in a World Wide Web (the "WWW" or "web") site accessible via the Internet. As is well known to those skilled in the art, the term "Internet" refers to the collection of networks and routers that use the Transmission Control Protocol/Internet Protocol ("TCP/IP") to communicate with one another. A representative section of the Internet 20 is shown in FIG. 1, in which a plurality of local area networks ("LANs") 24 and a wide area network ("WAN") 26 are interconnected by routers 22. The routers 22 are special purpose computers used to interface one LAN or WAN to another. Communication links within the LANs may be twisted wire pair, or coaxial cable, while communication links between networks may utilize 56 Kbps analog telephone lines, 1 Mbps digital T-1 lines, 45 Mbps T-3 lines or other communications links known to those skilled in the art. Furthermore, computers and other related electronic devices can be remotely connected to either the LANs 24 or the WAN 26 via a modem and temporary telephone or wireless link. It will be appreciated that the Internet 20 comprises a vast number of such interconnected networks, computers, and routers and that only a small, representative section of the Internet 20 is shown in FIG. 1. One skilled in the relevant art will appreciate that aspects of the present invention may be practiced on Internet networks, such as an Intranet.

The Internet has recently seen explosive growth by virtue of its ability to link computers located throughout the world. As the Internet has grown, so has the WWW. As is appreciated by those skilled in the art, the WWW is a vast collection of interconnected or "hypertext" documents written in HyperText Markup Language ("HTML"), or other markup languages, that are electronically stored at "WWW sites" or "Web sites" throughout the Internet. A WWW site is a server connected to the Internet that has mass storage facilities for storing hypertext documents and that runs administrative software for handling requests for those stored hypertext documents. A hypertext document normally includes a number of hyperlinks, i.e., highlighted portions of text which link the document to another hypertext document possibly stored at a WWW site elsewhere on the Internet. Each hyperlink is associated with a Uniform Resource Locator ("URL") that provides the exact location of the linked document on a server connected to the Internet and describes the document. Thus, whenever a hypertext document is retrieved from any WWW server, the document is considered to be retrieved from the WWW. As is known to those skilled in the art, a WWW server may also include facilities for storing and transmitting application programs, such as application programs written in the JAVA® programming language from Sun Microsystems, for execution on a remote computer. Likewise, a WWW server may also include facilities for executing scripts and other application programs on the WWW server itself.

A consumer or other remote consumer may retrieve hypertext documents from the WWW via a WWW browser application program. A WWW browser, such as Netscape's NAVIGATOR® or Microsoft's Internet Explorer, is a software application program for providing a graphical consumer interface to the WWW. Upon request from the consumer via the WWW browser, the WWW browser accesses and retrieves the desired hypertext document from the appropriate WWW server using the URL for the document and a protocol known as HyperText Transfer Protocol ("HTTP"). HTTP is a higher-level protocol than TCP/IP and is designed specifically for the requirements of the WWW. It is used on top of TCP/IP to transfer hypertext documents between servers and clients. The WWW browser may also retrieve application programs from the WWW server, such as JAVA applets, for execution on the client computer.

Figure 2:
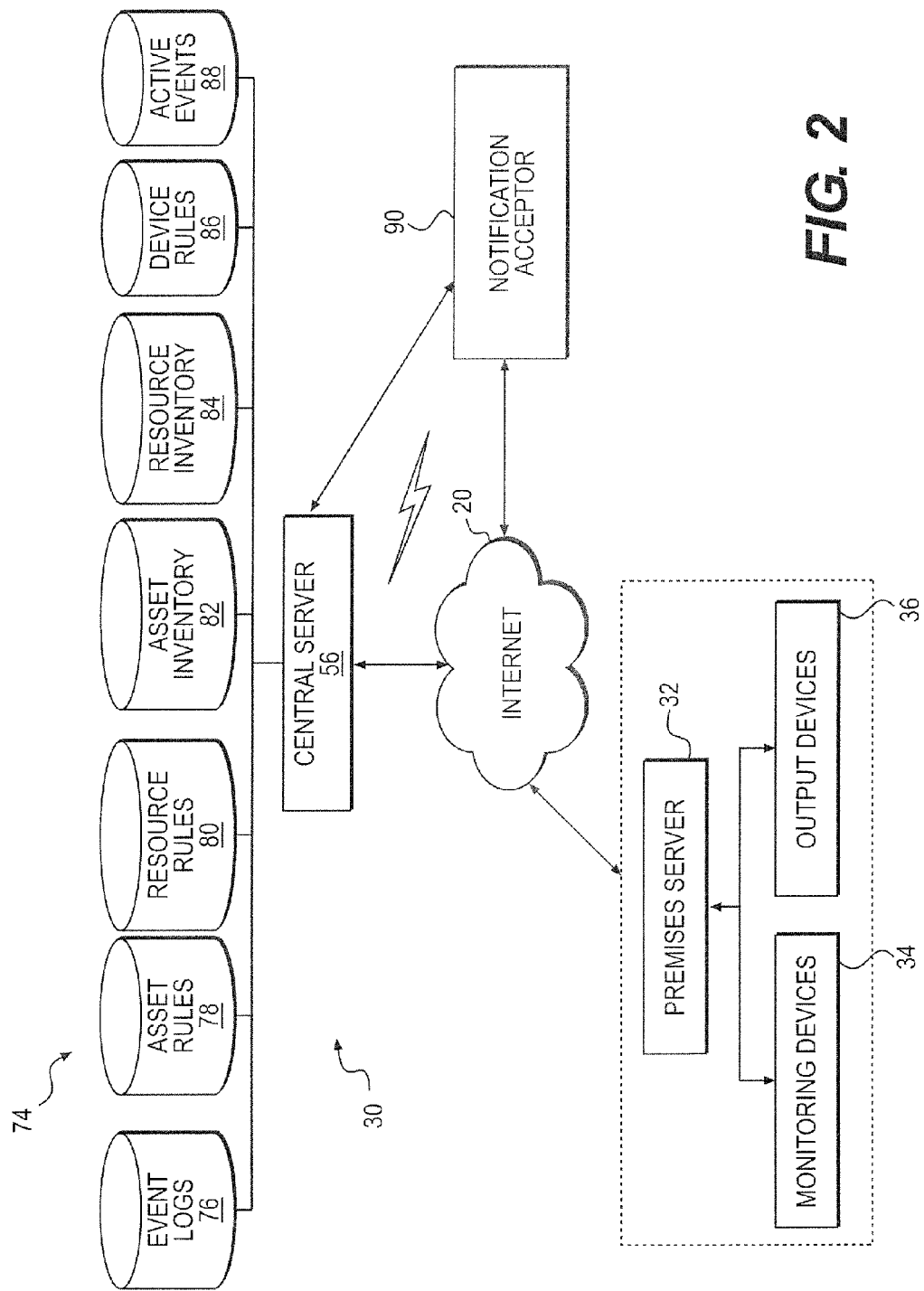
FIG. 2 is a block diagram of an monitoring system in accordance with the present invention.

Referring now to FIG. 2, an actual embodiment of an integrated information system 30 in accordance with the present invention will be described. An integrated information system 30 is a subscriber-based system allowing a number of monitoring devices within one or more premises to be processed at a single control location. Additionally, the data from the monitoring devices is processed according to one or more rules. The control location customizes output of the processed data to a number of authorized users dependent on the preferences and rights of the user. While the system of the present invention is utilized to integrate traditional security monitoring functions, it is also utilized to integrate any information input in a like manner.

With reference to FIG. 2, the integrated information system 30 includes a premises server 32 located on a premises. The premises server 32 communicates with one or more monitoring devices 34. As illustrated in FIG. 2, the premises server 32 communicates with the monitoring devices 34 via a network connection. A more detailed description of a network for communicating with monitoring devices, including the use of one or more device servers, is found in U.S. patent application Ser. No. 10/117,552, entitled SYSTEM AND METHOD FOR MANAGING A DEVICE NETWORK, filed Apr. 4, 2002, the disclosure of which is hereby incorporated by reference.

In an illustrative embodiment, the monitoring devices 34 can include any number and variety of monitoring devices including video cameras, still cameras, motion sensors, thermal sensors, door and window contacts, and microphones. Still further, the monitoring devices 34 can include computer network monitors, voice scanners, fingerprint, facial, retinal, or other biometric scanners. Still further, the monitoring devices 34 can include conventional panic buttons, global positioning satellite ("GPS") locators, other geographic locators, medical indicators, and vehicle information systems. The monitoring devices 34 can also be integrated with other existing information systems, such as retail point-of-sale systems, transportation systems, passenger information systems, or the like. It will be apparent to one skilled in the relevant art that additional or alternative monitoring devices 34 may be practiced with the present invention.

The premises server 32 also communicates with one or more output devices 36. In an illustrative embodiment, the output devices 36 can include audio speakers, sirens, or other audio/visual displays. The output devices 36 may also include any of a number and variety of electrical or electro-mechanical devices that allow the system to perform actions. The output devices 36 can include computer system interfaces, telephone interfaces, wireless interfaces, door and window locking mechanisms, aerosol sprayers, and the like. As will be readily understood by one skilled in the art, the type of output device is associated primarily with the type of action the information system 30 produces. Accordingly, additional or alternative output devices 36 are considered to be within the scope of the present invention. In accordance with the present invention, the monitoring devices 34 and the output devices 36 can be linked together in a computer network environment in which multiple premises servers 32 work in parallel, sharing data and processes. Moreover, additional premises servers 32, monitoring devices 34, and output devices 36 may be joined modularly to provide extensibility to the system.

Figure 3:
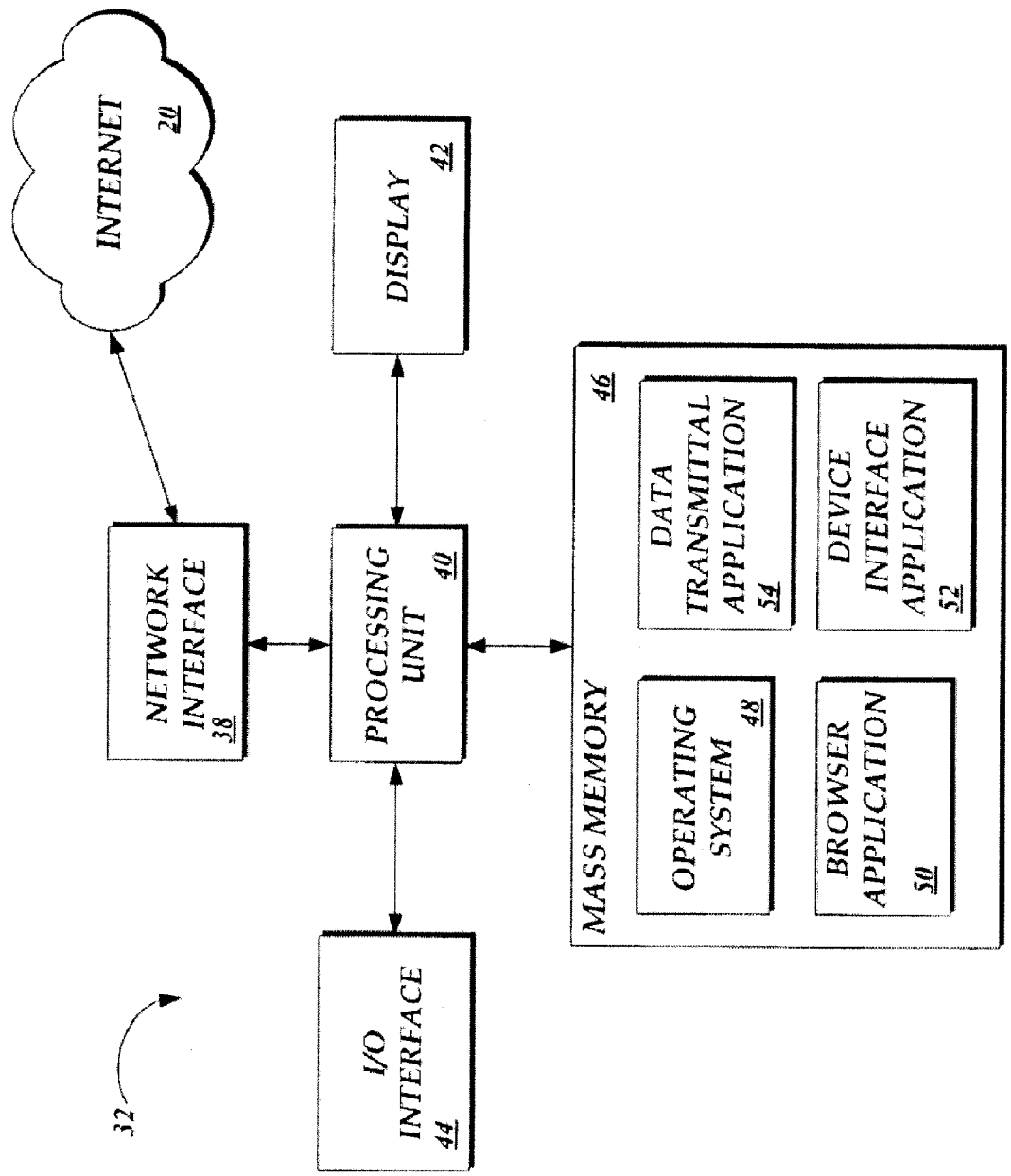
FIG. 3 is a block diagram depicting an illustrative architecture for a premises server in accordance with the present invention.

FIG. 3 is a block diagram depicting an illustrative architecture for a premises server 32. Those of ordinary skill in the art will appreciate that the premises server 32 includes many more components then those shown in FIG. 3. However, it is not necessary that all of these generally conventional components be shown in order to disclose an illustrative embodiment for practicing the present invention. As shown in FIG. 3, the premises server 32 includes a network interface 38 for connecting directly to a LAN or a WAN, or for connecting remotely to a LAN or WAN. Those of ordinary skill in the art will appreciate that the network includes the necessary circuitry for such a connection, and is also constructed for use with the TCP/IP protocol, the particular network configuration of the LAN or WAN it is connecting to, and a particular type of coupling medium. The premises server 32 may also be equipped with a modem for connecting to the Internet through a point to point protocol ("PPP") connection or a serial line Internet protocol ("SLIP") connection as known to those skilled in the art.

The premises server 32 also includes a processing unit 40, a display 42, an input/output (I/O) interface 44 and a mass memory 46, all connected via a communication bus, or other communication device. The I/O interface 44 includes hardware and software components that facilitate interaction with a variety of the monitoring devices via a variety of communication protocols including TCP/IP, X10, digital I/O, RS-232, RS-485 and the like. Additionally, the I/O interface 44 facilitates communication via a variety of communication mediums including telephone land lines, wireless networks (including cellular, digital and radio networks), cable networks and the like. In an actual embodiment of the present invention, the I/O interface is implemented as a layer between the server hardware and software applications utilized to control the individual monitoring devices. It will be understood by one skilled in the relevant art that alternative interface configurations may be practiced with the present invention.

The mass memory 46 generally comprises a RAM, ROM, and a permanent mass storage device, such as a hard disk drive, tape drive, optical drive, floppy disk drive, or combination thereof. The mass memory 46 stores an operating system 48 for controlling the operation of the premises server. It will appreciated that this component may comprises a general-purpose server operating system as is known to those skilled in the art, such as UNIX, LINUX™, or Microsoft WINDOWS NT®. The memory also includes a WWW browser 50, such as Netscape's NAVIGATOR® or Microsoft's Internet Explorer browsers, for accessing the WWW.

The mass memory 46 also stores program code and data for interfacing with various premises monitoring devices, for processing the monitoring device data and for transmitting the data to a central server. More specifically, the mass memory stores a device interface application 52 in accordance with the present invention for obtaining monitoring device data from a variety of devices and for manipulating the data for processing by the central server. The device interface application 52 comprises computer-executable instructions which, when executed by the premises server 32 obtains and transmits device data as will be explained below in greater detail. The mass memory 46 also stores a data transmittal application program 54 for transmitting the device data to a central server and to facilitate communication between the central server and the monitoring devices 34. The operation of the data transmittal application 54 will be described in greater detail below. It will be appreciated that these components may be stored on a computer-readable medium and loaded into the memory of the premises server using a drive mechanism associated with the computer-readable medium, such as a floppy, CD-ROM, DVD-ROM drive, or network drive.

Figure 4:
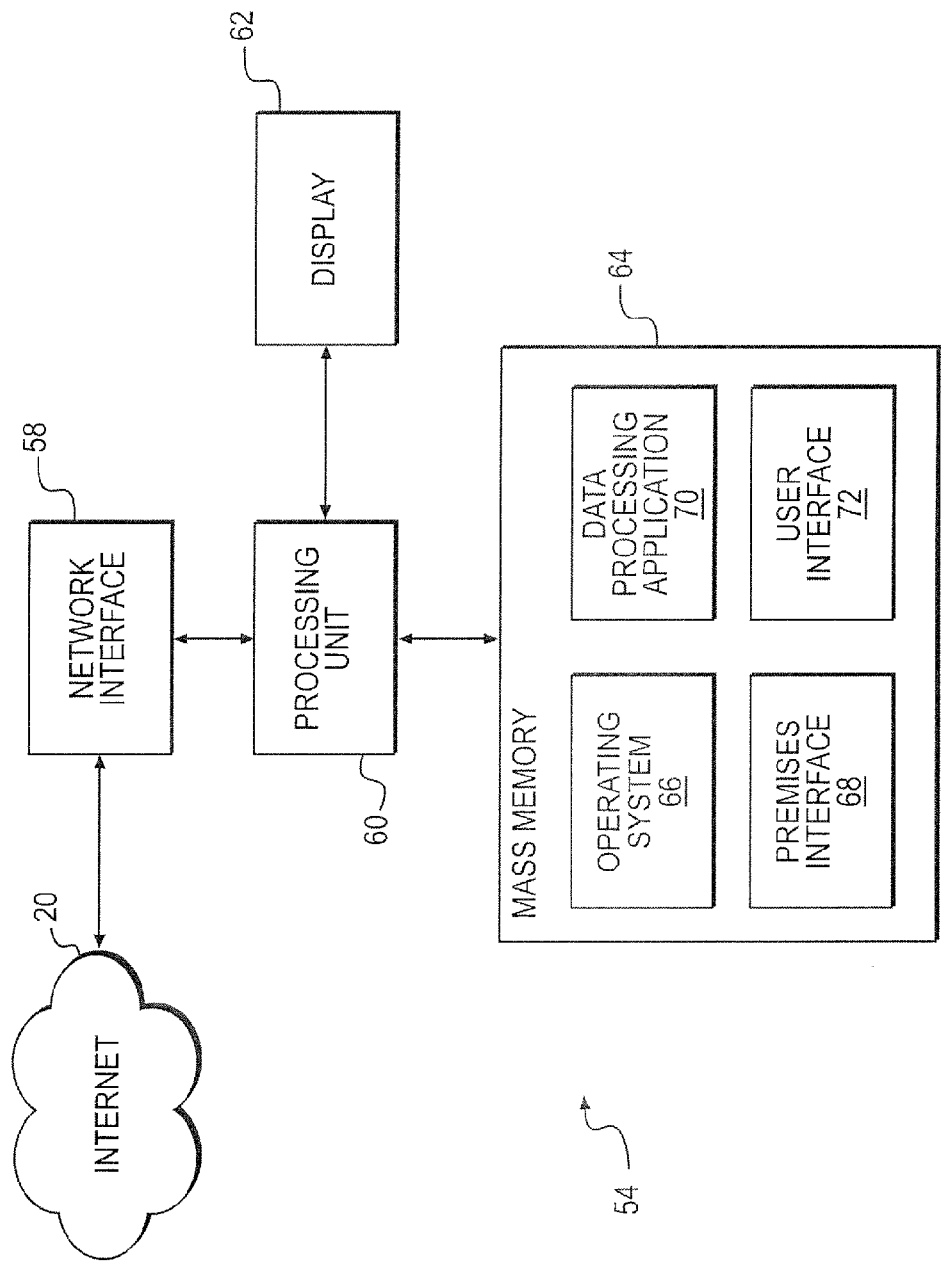
FIG. 4 is a block diagram depicting an illustrative architecture for a central server in accordance with the present invention.

Returning to FIG. 2, the premises server 32 is in communication with a central server 56. Generally described, the central server 56 obtains various monitoring device data, processes the data and outputs the data to one or more authorized users. In an illustrative embodiment, the communication between the central server 56 and the premises server 32 is remote and two-way. FIG. 4 is a block diagram depicting an illustrative architecture for a central server 56. Those of ordinary skill in the art will appreciate that the central server 56 includes many more components then those shown in FIG. 4. However, it is not necessary that all of these generally conventional components be shown in order to disclose an illustrative embodiment for practicing the present invention.

As shown in FIG. 4, the central server 56 includes a network interface 58 for connecting directly to a LAN or a WAN, or for connecting remotely to a LAN or WAN. Those of ordinary skill in the art will appreciate that the network interface includes the necessary circuitry for such a connection, and is also constructed for use with the TCP/IP protocol, the particular network configuration of the LAN or WAN it is connecting to, and a particular type of coupling medium. The central server 56 may also be equipped with a modem for connecting to the Internet 20.

The central server 56 also includes a processing unit 60, a display 62 and a mass memory 64, all connected via a communication bus, or other communication device. The mass memory 64 generally comprises a RAM, ROM, and a permanent mass storage device, such as a hard disk drive, tape drive, optical drive, floppy disk drive, or combination thereof. The mass memory 64 stores an operating system 66 for controlling the operation of the central server. It will be appreciated that this component may comprise a general-purpose server operating system.

The mass memory 64 also stores program code and data for interfacing with the premises devices, for processing the device data and for interfacing with various authorized users. More specifically, the mass memory 64 stores a premises interface application 68 in accordance with the present invention for obtaining data from a variety of monitoring devices and for communicating with the premises server. The premises interface application 68 comprises computer-executable instructions which, when executed by the central server 56, interfaces with the premises server 32 as will be explained below in greater detail. The mass memory 64 also stores a data processing application 70 for processing monitoring device data in accordance with self-learning rules maintained within the central server (or premises server). The operation of the data processing application 70 will be described in greater detail below. The mass memory 64 further stores an authorized user interface application 72 for outputting the processed monitoring device data to a variety of authorized users in accordance with the security process of the present invention. The operation of the authorized user interface application 72 will be described in greater detail below. It will be appreciated that these components may be stored on a computer-readable medium and loaded into the memory of the central server using a drive mechanism associated with the computer-readable medium.

It will be understood by one skilled in the relevant art that the premises server 32 may be remote from the premises or may omitted altogether. In such an alternative embodiment, the monitoring devices 34 transmit the monitoring data to a remote premises server 32 or alternatively, they transmit the monitoring data directly to the central server 56.

Also in communication with the central server 56 is a central database 74. In an illustrative embodiment, the central database 74 includes a variety of databases including an event logs database 76, an asset rules database 78, a resource rules database 80, an asset inventory database 82, a resource inventory database 84, an event rules database 86 and an active events database 88. The utilization of the individual databases within the central database 74 will be explained in greater detail below. As will be readily understood by one skilled in the relevant art, the central database 74 may be one or more databases, which may be remote from one another. Additionally, it will be further understood that one or more of the databases 74 may be maintained outside of the central server 56 (as in single or multiple premises servers).

With continued reference to FIG. 2, the central server 56 communicates with one or more notification acceptors 90. In an illustrative embodiment, the notification acceptors 90 include one or more authorized users. Each authorized user has a preference of notification means as well as rights to the raw and processed monitoring data. The authorized users include premises owners, security directors or administrators, on-site security guards, technicians, remote monitors (including certified and non-certified monitors), customer service representatives, emergency personnel and others. As will be readily understood by one skilled in the art, various user authorizations may be practiced with the present invention. Additionally, it will be further understood that one or more of the rules databases may be maintained outside of the central server.

In an illustrative embodiment of the present invention, the central server 56 communicates with the notification acceptors 90 utilizing various communication devices and communication mediums. The devices include personal computers, hand-held computing devices, wireless application protocol enabled wireless devices, cellular or digital telephones, digital pagers, and the like. Moreover, the central server 56 may communicate with these devices via the Internet 20 utilizing electronic messaging or Web access, via wireless transmissions utilizing the wireless application protocol, short message services, audio transmission, and the like. As will be readily understood by one skilled in the art, the specific implementation of the communication mediums may require additional or alternative components to be practiced. All are considered to be within the scope of practicing the present invention.

Generally described, the present invention facilitates the collection and processing of a variety of premises information for distribution to one or more authorized users in a highly extensible manner. The system of the present invention obtains monitoring data from any one of a variety of monitoring devices 34. In an actual embodiment of the present invention, the monitoring device data is categorized as asset data, resource data or event data. Asset data is obtained from a monitoring device corresponding to an identifiable object that is not capable of independent action. For example, asset data includes data obtained from a bar code or transponder identifying a particular object, such as a computer, in a particular location. Resource data is obtained from a monitoring device corresponding to an identifiable object that is capable of independent action. For example, resource data includes data from a magnetic card reader that identifies a particular person who has entered the premises. Event data is obtained from a monitoring device corresponding to an on/off state that is not correlated to an identifiable object. Event data is a default category for all of the monitoring devices. As will be readily understood by one skilled in the relevant art, alternative data categorizations are considered to be within the scope of the present invention.

The monitoring device data is obtained from the monitoring devices 34 by one or more device servers. The premises server collects data from the device servers (or directly from devices) and processes the data or transmits the data to the central server 32 for processing The central server 56 (or premises server) receives the monitoring device data and processes the data according to a rules-based decision support logic Monitoring device data in databases 74 is stored in fact tables. Fact tables, as is known to those skilled in the art of data warehousing, are tables that contain measures of interest. Fact tables employ data cubes that consist of descriptive categories (dimensions) and quantitative values (measures). As is known to those skilled in the art, data cubes allow users to complete complex analyses by viewing data that has been aggregated based upon user requirements. Data within each dimension can be organized into levels of hierarchy. A unique level within a dimension is an attribute. (For example "month" is an attribute in the "time" dimension.) In an illustrative embodiment of the present invention, fact table data is updated periodically to reflect desired norms within a given dimension. Norms may be specific to a premises, or may be affected by external circumstances such as a threat level determination which includes a monitored premises. In this way, monitoring device data may be compared to norms for that data to determine a rule violation.

In an actual embodiment of the present invention, the central server 56 is in communication with one or more dimensional data databases 74 that contain fact tables with collected normative dimensions for that device data. The attributes of the collected device data are compared to the normative attributes and the rule contains a threshold tolerance for variance. In the event the processing of the monitoring device rules indicates that action is required, the central server (or premises server, if processed at that level) 56 generates one or more outputs associated with the rules. The outputs include communication with indicated notification acceptors 90 according to the monitoring device data rules. For example, an authorized user may indicate a hierarchy of communication mediums (such as pager, mobile telephone, land-line telephone) that should be utilized in attempting to contact the user. The rules may also indicate contingency contacts in the event the authorized user cannot be contacted. Additionally, the rules may limit the type and/or amount of data to which the user is allowed to access. Furthermore, the outputs can include the initiation of actions by the central server 56 in response to the processing of the rules.

Figure 5:
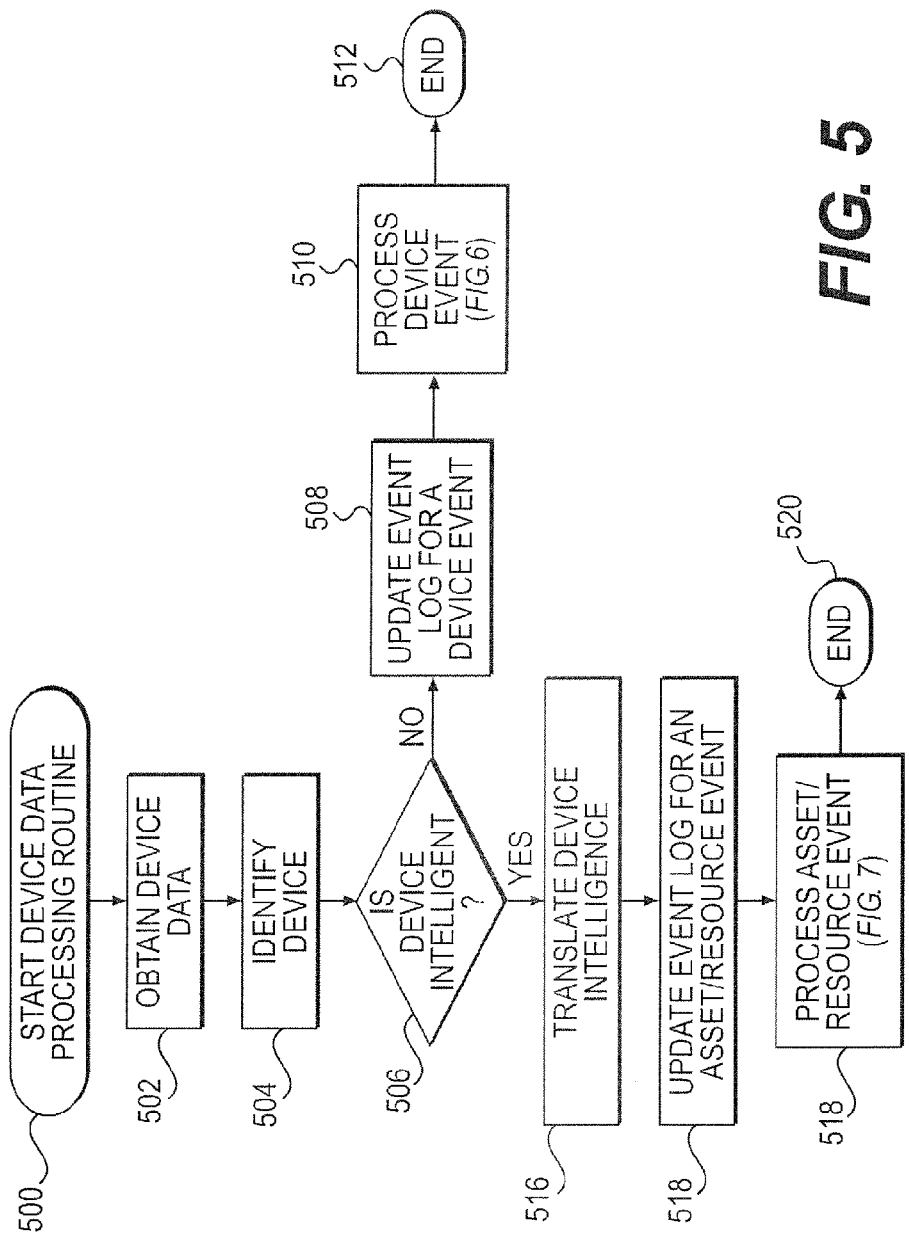
FIG. 5 is a flow diagram illustrative of a monitoring device data processing routine in accordance with the present invention.

FIG. 5 is a flow diagram illustrative of a device decision support process support routine 500 for processing the monitoring device data in accordance with the present invention. At block 502, the central server 56 (or premises server) obtains an input from a monitoring device or device server. In an actual embodiment of the present invention, the input is obtained from the premises server 32. Alternatively, the input may be received directly from the monitoring device 34 or the central server 56 may poll individual devices (or the premises server 32) for an input. At block 504, the central server 56 (or premises server) identifies the device processing the data. The identification may be accomplished by determining a network address from which the input originated and which is assigned to the specific devices, or by reading other identification data that can be included with the data input.

At decision block 506, a test is performed to determine whether the device data includes intelligence data. In an actual embodiment of the present invention, the intelligence data includes data that characterizes the data as asset data or resource data, because the data contains information identifying the object. In contrast, data that does not contain any information identifying an object and is not considered intelligent. If the device is not determined to be intelligent or if the device cannot be identified, at block 508, an event log database 76 is updated to reflect the input data. At block 510, the central server 56 processes the data according to a process device event subroutine. The routine 500 terminates at block 512.

Figure 6:
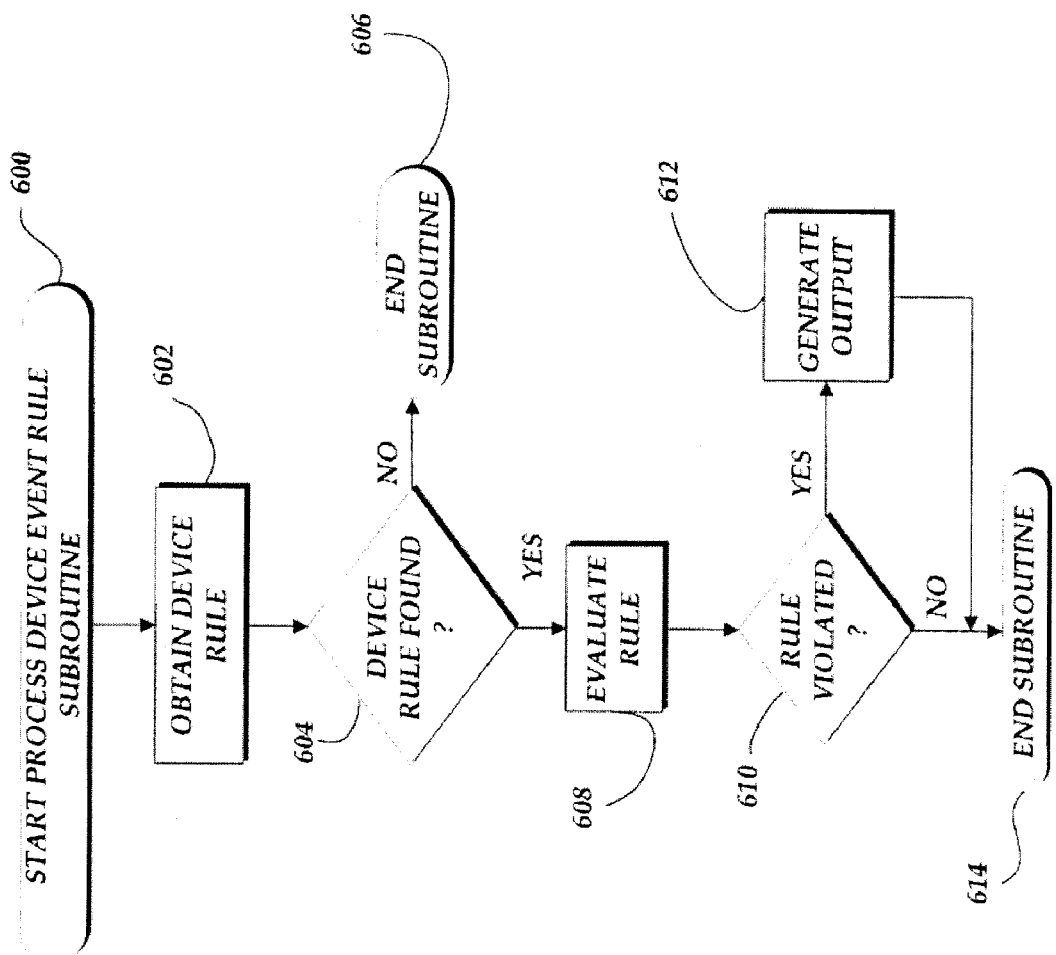
FIG. 6 is a flow diagram illustrative of a device event processing subroutine in accordance with the present invention.

FIG. 6 is a flow diagram illustrative of a process device event subroutine 600 in accordance with the present invention. At block 602, the central server 56 obtains the self-learning monitoring device rules. The actual self-learning monitoring rule applied to the monitoring device data may be either specific to the device that produced the monitoring device data or generically, by device category or function. In an actual embodiment, the self-learning monitoring device rules are stored in a database in communication with premises server. The self-learning monitoring rules are used to compare the monitoring device data to the data stored in the fact table for the device. The rules contain data indicating one or more ranges for a given dimension that is used to determine a rule violation.

At decision block 604 a test is performed to determine whether a device rule is found. If no rule is found, the process terminates at block 606. If, however, a device rule is found, at block 608 the central server 56 evaluates the rule according to the data received from the monitoring device 34. In an illustrative embodiment, the rules may include preset or default rules maintained by the central server 56. Additionally, the rules may include independently created rules by one or more authorized users. Moreover, one or more authorized users may be given the authority to modify or update rules via a user interface.

At decision block 610, a test is performed to determine whether the device rule is violated. If the rule is violated, at block 612, the central server 56 (or premises server) creates a rule violation output. In an actual embodiment of the present invention, the rules violation output instructions are included in the rule. The instructions include a list of the authorized users to notify in the event of a rule violation and a hierarchy of which communication medium and devices should be utilized to contact each authorized user. Alternatively, the central server may also maintain an output database indicating the output instructions corresponding to each rule.

In addition to generating communications, the rules violation output may also instigate an integrated system response. For example, in the case of an intrusion, a dye may be sprayed on the intruder from an aerosol sprayer. Additionally, the system may sound an audible alarm and directly dial emergency personnel. In another example, if the system rules violation is a medical emergency, the central server 56 may call an ambulance, turn on lights within the premises, and unlock the doors to facilitate entry by the emergency personnel.

Once the central server 56 (or premises server) has generated the rules violation output at block 612 or if the event rule is not violated at block 610, the subroutine 600 terminates at block 614.

Returning to FIG. 5, if at block 506, the device data includes intelligence information, at block 514, the intelligence is translated from the monitoring device data. At block 516, the log event database 76 is updated to reflect the input data. At block 518, the central server 56 processes the data according to a process asset/resource event subroutine. The routine 500 terminates at block 520.

Figure 7A:
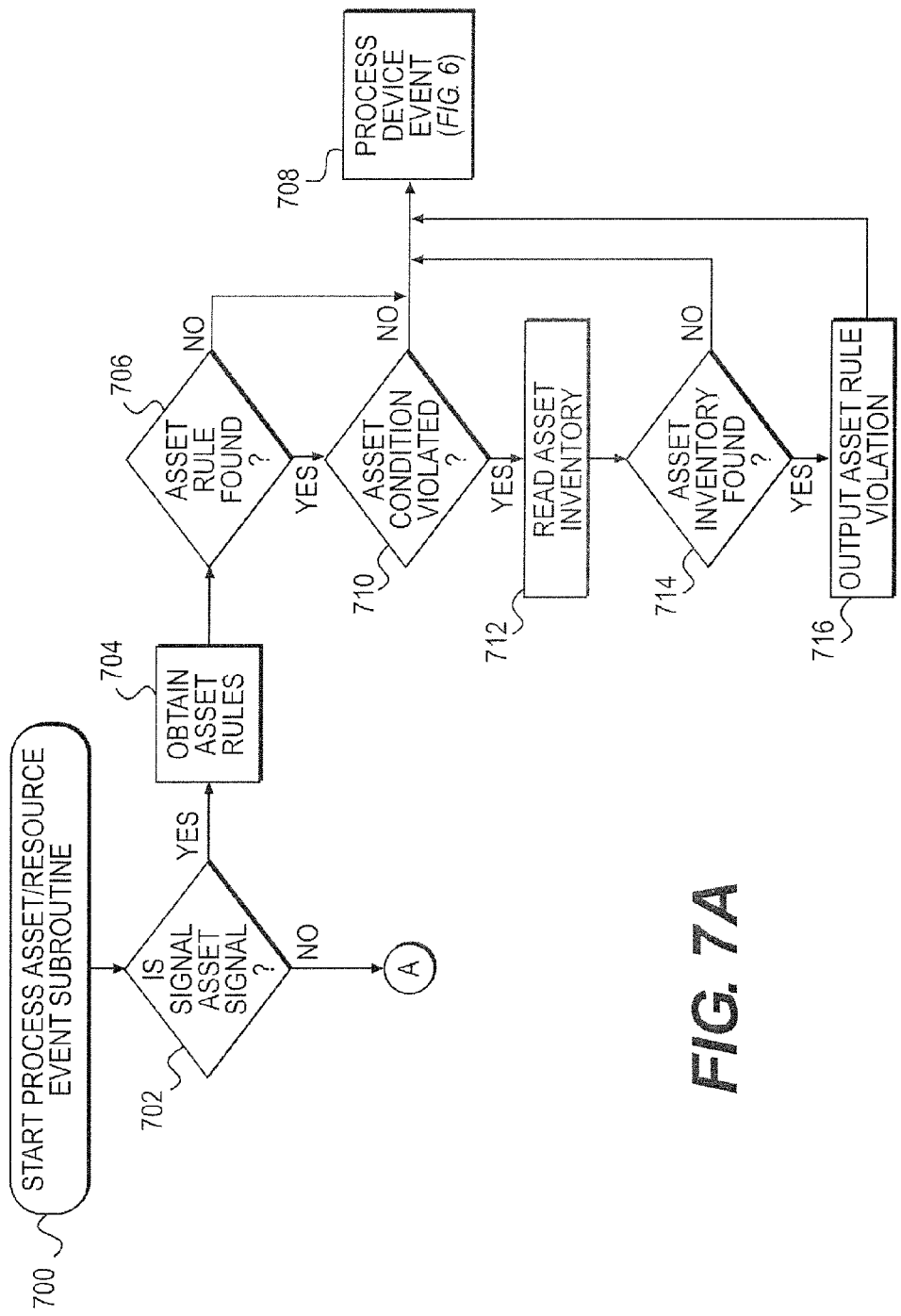
FIGS. 7A and 7B are flow diagrams illustrating an asset/resource event processing subroutine in accordance with the present invention.
Figure 7B:
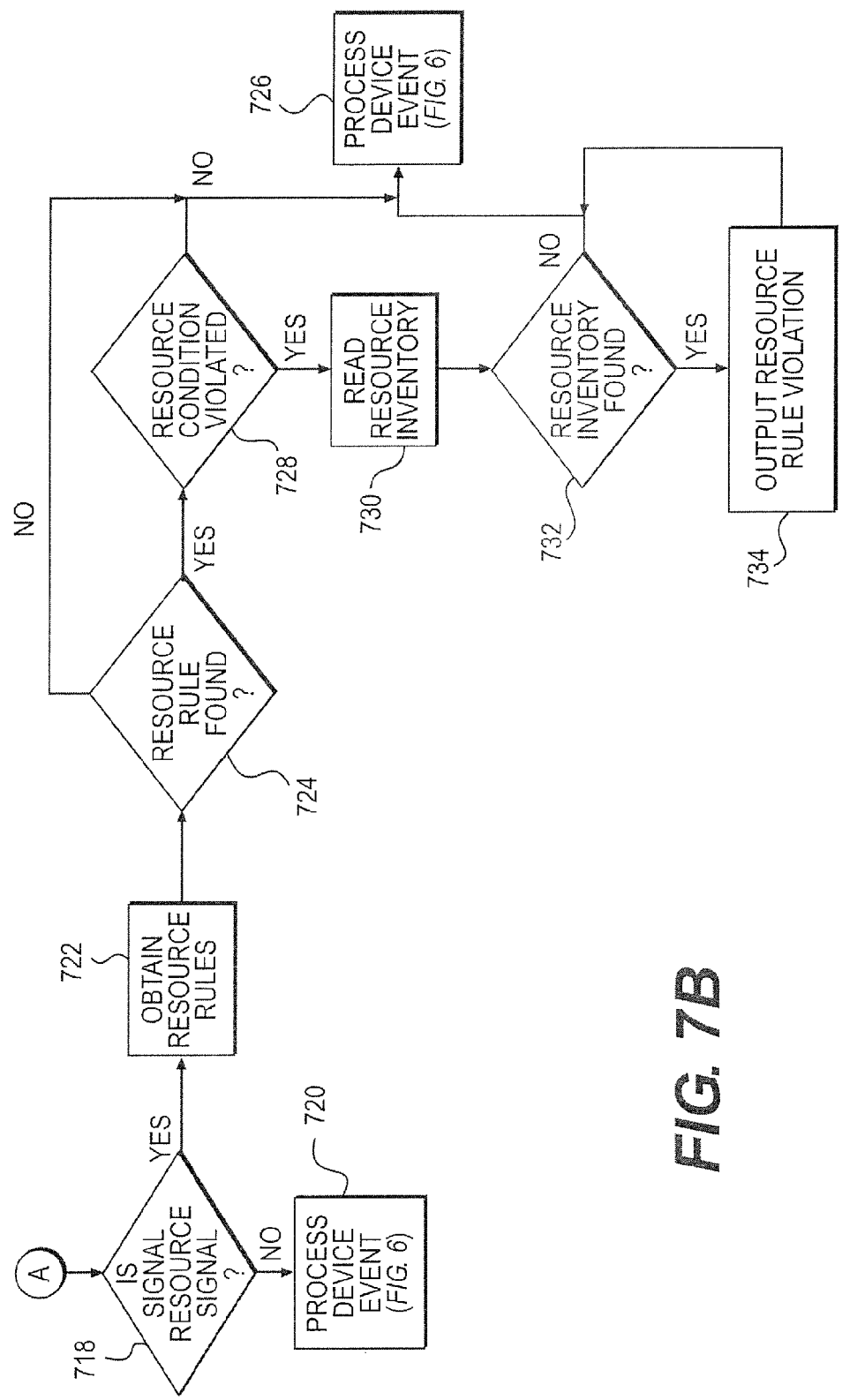

FIGS. 7A and 7B are flow diagrams illustrative of a process asset or resource event subroutine 700 in accordance with the present invention. With reference to FIG. 7A, at decision block 702, a test is performed to determine whether the input signal is asset data. If the signal is identified as asset data, at block 704, the asset rules are obtained. In an actual embodiment of the present invention, the asset rules are maintained and retrieved from an asset rules database 78. At block 706, a test is performed to determine whether an asset rule is found. If no asset rule is found for the asset, the monitoring device data is processed as a device event at block 708. In an actual application of the present invention, the device event is processed as described above with respect to the device event processing subroutine 600 (FIG. 6). In an illustrative embodiment of the present application, in the event the asset rule processing cannot be completed, the monitoring device is still processed as a device-level event.

If an asset rule is found, at decision block 710, a test is performed to determine whether the asset rule is violated. In an actual embodiment of the present invention, the asset rule contains data allowing the central server 56 to determine a rule violation. For example, an asset rule may contain information indicating a requirement of both a particular object (e.g., a computer) performing an action (e.g., logged into a network) for a violation. Additionally, the asset rule may indicate that additional device, resource or asset rules may be considered prior to determining whether the rule has been violated. As explained above, the rules may include preset rules maintained by the central server and user implemented/modified rules.

If the rule has not been violated, the monitoring device data is processed as a device event at block 708. It will be generally understood by one skilled in the relevant art, that processing the rule as a both an asset and a device event allows for multiple purpose processing of the monitoring device data, such as the detection of a specific object and the detection of an object.

If the asset rule has been violated, at block 712, the central server 56 reads a known asset inventory to identify the asset. In an actual embodiment of the present invention, central server maintains and reads from an asset inventory database 82. At decision block 714, a test is performed to determine whether the asset is found in the asset inventory. If the asset is not found, the system defaults to processing the monitoring device data as a device event at block 708. If the asset is found in the asset inventory, at block 716, central server 56 outputs the asset violation. In an actual embodiment of the present invention, the asset rule contains instructions for generating output in the event of a rule violation to one or more authorized users. The instructions also contain a hierarchy of communication mediums and communication devices to attempt to contact the authorized user. Additionally, the instructions may contain alternative contact personnel if central server cannot contact the authorized user. Moreover, as explained above, the output may also instigate action by the integrated system. At block 708, the monitoring device data is processed as a device event.

With reference to FIG. 7B, if the signal is not determined to be asset data at block 702 (FIG. 7A), at decision block 718, a test is done to determine whether the inputted signal is resource data. If the signal is not identified as resource data, at block 720, the monitoring device data is processed as a device event. In an actual application of the present invention, the device event is processed as described above with respect to the device event processing subroutine 600 (FIG. 6). If the signal is identified as resource data, at block 722, the resource rules are obtained. In an actual embodiment of the present invention, the resource rules are maintained and retrieved from a resource rules database 80. At block 724, a test is performed to determine whether a resource rule is found. If no resource rule is found for the resource, the monitoring device data is processed as a device event at block 726.

If a resource rule is found, at decision block 728, a test is performed to determine whether the resource rule is violated.

In an actual embodiment of the present invention, the resource rule contains data allowing the central server to determine a rule violation. Additionally, the resource rule may indicate that additional device, resource or asset rules may be considered prior to determining whether the rule has been violated. If the rule has not been violated, at block 726, the monitoring device data is processed as a device event. It will be generally understood by one skilled in the relevant art, that processing the rule as a both a resource and a device event allows for multiple purpose processing of the monitoring device data.

If the resource rule has been violated, at block 730, the central server 56 reads a known resource inventory to identify the resource. In an actual embodiment of the present invention, central server 56 maintains and reads from a resource inventory database 84. At decision block 732, a test is performed to determine whether the resource is found in the resource inventory. If the resource is not found, the system defaults to processing the monitoring device data as a device event at block 726. If the resource is found in the resource inventory, at block 734, central server 56 outputs the resource violation. In an actual embodiment of the present invention, the resource rule contains instructions for generating output in the event of a rule violation to one or more authorized users. The instructions also contain a hierarchy of communication mediums and communication devices to attempt to contact the authorized user. Additionally, the instructions may contain alternative contact personnel if central server 56 cannot contact the authorized user. Moreover, as explained above, the output may also instigate action by the integrated system. At block 726, the monitoring device data is processed as a device event.

In another aspect of the present invention, the transmission of the monitoring device data and output data is facilitated through standard communication mediums, such as the Internet. However, the use of standard communication channels creates a need for data security and integrity. For example, in the case of conventional video transmission over the Internet, such as streaming, loss of video data is common and utilized to reduce data size. As will be generally understood by one skilled in the relevant art, however, the loss of video frame data for detecting a security event is generally unacceptable.

The present invention overcomes the deficiencies by implementing a packet encrypted data transmission method. In accordance with this aspect of the present invention, the premises server packages the monitoring device data into smaller sized data packets. Each data packet is compressed, encrypted and sent to the device processing server over the Internet. The central server obtains the packet and decrypts the data. The data is processed and an acknowledge signal is sent to the premises server. The premises server then is ready to send the next package. If the data cannot be processed or appears to be compromised, the central server will not acknowledge the packet. Accordingly, the premises server will either try to resend the packet or fail the transmission. As will be readily understood by one skilled in the art, the method is also utilized to transmit data from the central server to the premises server or to a notification acceptor.

The encrypted package transmission method of the present invention allows the security network to utilize standard communication channels, while mitigating the security risks associated with those channels. Moreover, the method further mitigates the loss of data in transmitting the data through the security network.

The present invention facilitates the integration of a variety of monitoring devices such that monitored data may be processed by a system applying multiple rules. By evaluating the monitored data by one or more rules having different outputs, the same monitoring data may be utilized by different authorized users, having different access rights, for different purposes. This also allows the system to be customized for different privacy regulations.

In yet another aspect of the present invention, the integrated information system 10 is implemented to provide support to an unlimited number of devices in a single distributed data network. In this embodiment, the multiple premises server computers 32, monitoring devices 34, and output devices 36 are linked together in a computer network and associated into a single logical connector. Accordingly, the processing of the monitoring device data may be distributed over any number of premises servers 32. Additionally, a distributed network environment provides a modularity to system. The modularity allows for expansion and/or reconfiguration of the integrated information.

While illustrative embodiments have been illustrated and described, it will be appreciated that various changes can be made therein without departing from the spirit and scope of the invention.

The embodiment of the invention in which an exclusive property or privilege is claimed as defined as follows:

1. A method for processing device data comprising:
   obtaining device data corresponding to one or more monitoring devices;
   comparing the monitoring device data to a set of previously collected device data; and
   generating an output if the monitoring device data substantially deviates from the set of previously collected monitoring device data,
   wherein the monitoring device data is stored in tables that include dimensions and measures, wherein the monitoring device data stored in the tables is updated periodically to reflect desired norms within a given dimension, and wherein the monitoring device data is compared to the desired norms to determine a rule violation.

2. The method as recited in claim 1, wherein comparing the monitoring device data to a set of previously collected monitoring device data includes comparing the monitoring device data to a subset of the previously collected monitoring device data.

3. The method as recited in claim 2 further comprising selecting a subset of the collected monitoring device data according to time criteria.

4. The method as recited in claim 2 further comprising selecting a subset of the collected monitoring device data according to a specified event.

5. The method as recited in claim 1, wherein the output corresponding to the generation of an alarm signal.

6. The method as recited in claim 1, wherein the output corresponding to an activation of one or more devices.

7. The method as recited in claim 1, wherein the output corresponding to the generation of notification or notification sequences.

8. The method of claim 1, further comprising:
   obtaining collected normative dimensions for the monitoring device data; and
   comparing the monitoring device data with the collected normative dimensions to determine if a threshold tolerance for variance is exceeded.

9. The method of claim 1, further comprising communicating the at least one output to an authorized user using a hierarchy of communication mediums.

10. The method of claim 1, wherein the tables are fact tables that employ data cubes that include dimensions and measures.

11. A computer-readable medium having computer-executable components for processing monitoring device data comprising:
- a data interface component for obtaining monitoring device data;
- a rules component for storing a set of previously collected monitoring device data; and
- a data processing application for determining whether the monitoring device data substantially deviates from the set of previously collected monitoring device data,
- wherein the monitoring device data is stored in tables that include dimensions and measures, wherein the monitoring device data stored in the tables is updated periodically to reflect desired norms within a given dimension, and wherein the monitoring device data is compared to the desired norms to determine a rule violation.

12. The computer-readable medium as recited in claim 11, wherein the monitoring device data corresponds to information from an analog or digital video camera.

13. The computer-readable medium as recited in claim 11 further comprising an output component for generating an output if the monitoring device data substantially deviates from the set of previously collected monitoring device data.

14. The computer-readable medium of claim 11, wherein the data processing application obtains collected normative dimensions for the monitoring device data and compares the monitoring device data with the collected normative dimensions to determine if a threshold tolerance for variance is exceeded.

15. The computer-readable medium of claim 11, wherein the data processing application communicates the at least one output to an authorized user using a hierarchy of communication mediums.

16. The computer-readable medium of claim 11, wherein the tables are fact tables that employ data cubes that include dimensions and measures.

17. A system for processing monitoring device data comprising:
- at least one information collection computing device for obtaining monitoring device data from a number of monitoring devices, wherein the video analytics monitoring device data corresponds to at least one identifiable target;
- a central processing server in communication with the at a least one information collection computing device and operable to receive the monitoring device data;
- a processing rules data store having a set previously collected monitoring device data;
- wherein the central processing server determines whether the monitoring device data substantially deviates form the set of previously collected monitoring device data and generates at least one output corresponding to determination, wherein the monitoring device data is stored in tables that include dimensions and measures, wherein the monitoring device data stored in the tables is updated periodically to reflect desired norms within a given dimension, and wherein the monitoring device data is compared to the desired norms to determine a rule violation.

18. The system of claim 17, wherein the central processing server obtains collected normative dimensions for the monitoring device data and compares the monitoring device data with the collected normative dimensions to determine if a threshold tolerance for variance is exceeded.

19. The system of claim 17, wherein the central processing server communicates the at least one output to an authorized user using a hierarchy of communication mediums.

20. The system of claim 17, wherein the tables are fact tables that employ data cubes that include dimensions and measures.

* * * * *